United States Patent
Ackerman et al.

(10) Patent No.: US 8,931,821 B2
(45) Date of Patent: Jan. 13, 2015

(54) ADHESIVELY BONDED WINDOW AND HARDWARE ASSEMBLY

(75) Inventors: Mark S. Ackerman, Brooklyn, MI (US); Daniel Bennett, Tecumseh, MI (US)

(73) Assignees: AGC Automotive Americas R&D, Inc., Ypsilanti, MI (US); AGC Flat Glass North America, Inc., Alpharetta, GA (US)

( * ) Notice: Subject to any disclaimer, the term of this patent is extended or adjusted under 35 U.S.C. 154(b) by 87 days.

(21) Appl. No.: 13/877,251

(22) PCT Filed: Oct. 14, 2011

(86) PCT No.: PCT/US2011/056266
§ 371 (c)(1),
(2), (4) Date: Apr. 1, 2013

(87) PCT Pub. No.: WO2012/051484
PCT Pub. Date: Apr. 19, 2012

(65) Prior Publication Data
US 2013/0214555 A1    Aug. 22, 2013

Related U.S. Application Data

(60) Provisional application No. 61/393,127, filed on Oct. 14, 2010.

(51) Int. Cl.
*B60J 7/00*    (2006.01)
*B60J 1/00*    (2006.01)
(Continued)

(52) U.S. Cl.
CPC *B60J 1/006* (2013.01); *B60J 10/02* (2013.01); *B60J 10/0002* (2013.01)

USPC ............. 296/96.21; 296/146.15; 296/191; 296/201; 428/428; 52/311.2

(58) Field of Classification Search
USPC ............. 296/84.1, 96.21, 146.15, 191, 201; 428/428; 52/311.2
See application file for complete search history.

(56) References Cited

U.S. PATENT DOCUMENTS 4,364,214 A * 12/1982 Morgan et al. ............ 296/191
4,551,372 A    11/1985 Kunert
(Continued)

FOREIGN PATENT DOCUMENTS

DE    3730345 A1    3/1989
EP    0121479 A1    10/1984
(Continued)

OTHER PUBLICATIONS

International Search Report for Application No. PCT/US2011/056266, dated Sep. 2, 2012.

*Primary Examiner* — Joseph D Pape
(74) *Attorney, Agent, or Firm* — Alston & Bird LLP

(57) ABSTRACT

An adhesively bonded window and hardware assembly includes a window member (12) presenting a surface (12a), a hardware member (14) having a flange (14a) and a projecting portion (14b) contiguous with and projecting from the flange, an adhesive member (18) disposed between the flange and the surface of the window member and adhesively bonding the hardware member (14) to the window member (12), and a sealing member (20) that envelopes part of the flange, fully surrounds the adhesive member, and bonds to and seals against the surface of the window member. The sealing member (20) serves to protect the adhesive member (18) from heat and humidity in the surrounding environment. The sealing member (20) can comprise an overmolded member formed of a polymer material.

12 Claims, 3 Drawing Sheets

(51) Int. Cl.
*B60J 10/02* (2006.01)
*B60J 10/00* (2006.01)

(56) References Cited

U.S. PATENT DOCUMENTS

| | | |
|---|---|---|
| 4,712,341 A | 12/1987 | Harris, Jr. et al. |
| 4,723,809 A | 2/1988 | Kida et al. |
| 4,938,521 A | 7/1990 | Kunert |
| 5,544,458 A | 8/1996 | Fisher et al. |
| 6,319,344 B1 * | 11/2001 | Lewno ............ 156/108 |
| 6,378,931 B1 | 4/2002 | Kolluri et al. |
| 8,048,529 B2 * | 11/2011 | Lewno ............ 428/425.6 |
| 8,235,452 B2 * | 8/2012 | Repp et al. ............ 296/146.16 |

FOREIGN PATENT DOCUMENTS

| | | |
|---|---|---|
| EP | 1040949 A2 | 10/2000 |
| WO | WO-99/58355 A1 | 11/1999 |

* cited by examiner

US 8,931,821 B2

ADHESIVELY BONDED WINDOW AND HARDWARE ASSEMBLY

BACKGROUND OF THE INVENTION

The present application relates to adhesively bonded window and hardware assemblies as commonly used in vehicular window products such as windshields, side windows, and the like.

Bonded vehicular window assemblies are known in which a two-component urethane adhesive is employed to affix an attachment member to a window panel. Other such assemblies are known in which a single-component adhesive is employed.

BRIEF SUMMARY OF THE PRESENT DISCLOSURE

The present disclosure relates to adhesively bonded window and hardware assemblies having an adhesive member for attaching a hardware member to a window member, and having provisions for protecting the adhesive member from exposure to environmental heat and humidity.

An adhesively bonded window and hardware assembly is described herein, comprising a window member presenting a surface, a hardware member having a flange and a projecting portion contiguous with and projecting away from the flange, an adhesive member disposed between the flange and the surface of the window member and adhesively bonding the hardware member to the window member, and a sealing member that envelopes part of the flange, fully surrounds the adhesive member, and bonds to and seals against the surface of the window member. The adhesive member has a smaller footprint than that of the flange, and the sealing member has a portion that intrudes between an outer peripheral portion of the flange and the surface of the window member, and fully surrounds the adhesive member.

In accordance with the present disclosure, the sealing member thus serves to protect the adhesive member from heat and humidity in the surrounding environment. The sealing member can comprise an overmolded member formed of a polymer material such as polyvinyl chloride, a thermoplastic elastomer, or any other suitable polymeric material. Alternatively, the sealing member can comprise a silicone bead, urethane bead, epoxy bead, or the like, applied by a process other than molding.

The assembly can further comprise a black ceramic layer interposed between the window member and the adhesive member for protecting the adhesive member from ultraviolet radiation transmitted through the window member.

The window member can comprise a piece of vehicular glazing. The hardware member can comprise any of various types of structures.

BRIEF DESCRIPTION OF THE SEVERAL VIEWS OF THE DRAWING(S)

Having thus described the invention in general terms, reference will now be made to the accompanying drawings, which are not necessarily drawn to scale, and which depict an adhesively bonded window and hardware assembly in accordance with one exemplary embodiment of the present invention.

DETAILED DESCRIPTION OF THE DRAWINGS

The present invention now will be described more fully hereinafter with reference to the accompanying drawings in which one exemplary embodiment of the invention is shown. However, the invention may be embodied in many different forms and should not be construed as limited to the embodiments set forth herein; rather, this embodiment is provided so that this disclosure will satisfy applicable legal requirements. Like numbers refer to like elements throughout.

Figure 1:
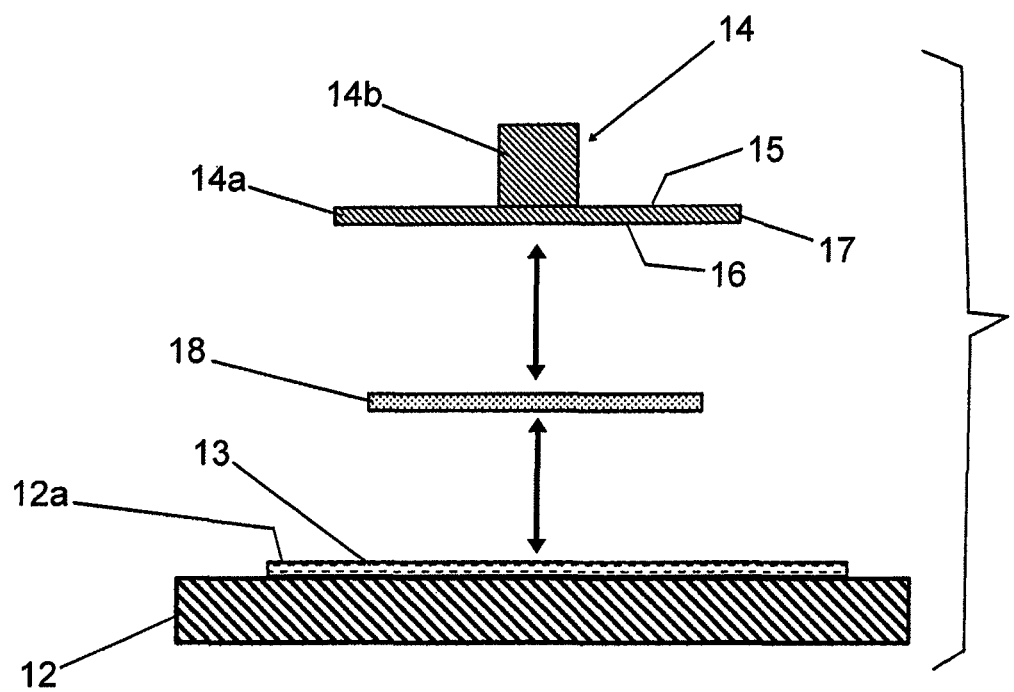
FIG. 1 illustrates a step in a process of making a bonded window and hardware assembly in accordance with an embodiment of the invention.

FIG. 1 shows an exploded view of a sub-assembly of a window and hardware assembly in accordance with one embodiment of the invention. The sub-assembly includes a window member 12, an optional black ceramic layer 13 on the window member, a hardware member 14, and a heat-activated adhesive member 18.

The window member 12 presents a surface 12a. The window member 12 may comprise glass, or a polymer (e.g., polycarbonate), and may be a single layer or may be a multi-layer laminate or composite of more than one type of material (e.g., one or more glass layers laminated with one or more polymer layers). There is no limitation on the material makeup and construction of the window member for purposes of the present invention. The surface 12a of the window member may be a glass or polymer surface (when there is no black ceramic layer) or it may be a black ceramic surface when the black ceramic layer 13 is present.

The hardware member 14 comprises a flange 14a and a projecting portion 14b contiguous with the flange 14a. The flange 14a defines opposite first and second surfaces 15 and 16 both of which join with a peripheral edge surface 17 of the flange. The projecting portion 14b projects from the first surface 15 in a direction away from the opposite second surface 16.

The sub-assembly is formed by bonding the hardware member 14 to the window member 12 by means of the adhesive member 18. To this end, the adhesive member 18 is disposed between the second surface 16 of the flange 14a and the surface 12a of the window member 12 and these components are brought into intimately contacting relation as shown in FIG. 2.

The adhesive member 18 has a smaller footprint than that of the flange 14a such that a peripheral edge portion 16a of the second surface 16 of the flange is free of the adhesive member 18. This peripheral edge portion 16a extends about the entire circumference or periphery of the adhesive member 18. Because the adhesive member 18 has a definite, non-negligible thickness (which is exaggerated in the drawings, for illustration purposes), there is a space defined between the peripheral edge portion 16a of the flange and the opposing surface 12a of the window member, which space is bounded on its inner circumference by the outer edge of the adhesive member 18.

Figure 2:
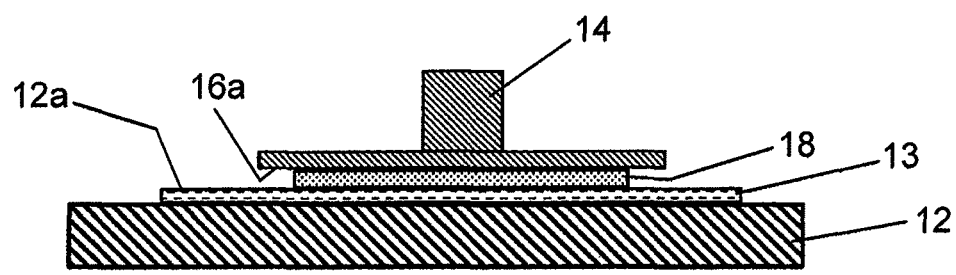
FIG. 2 depicts a sub-assembly resulting from the step of FIG. 1.
Figure 3:
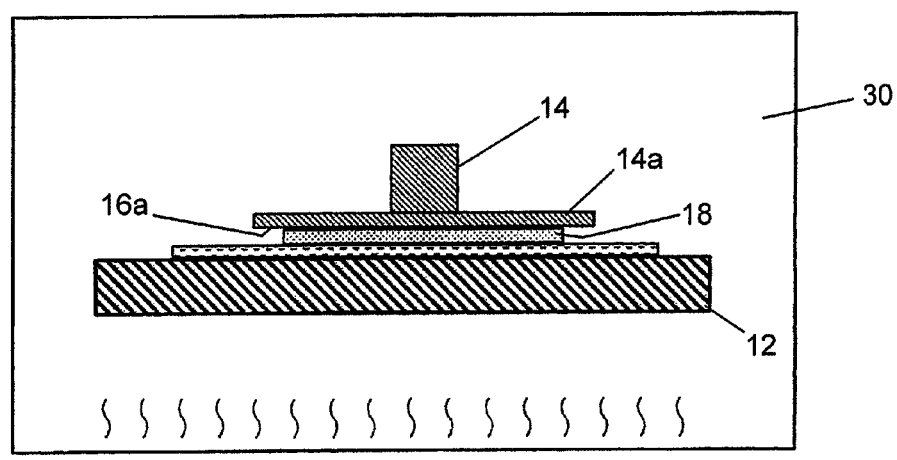
FIG. 3 illustrates a further step in the process.

The resulting sub-assembly of FIG. 2 is heated, such as in an autoclave 30 or the like, as shown in FIG. 3, to activate the heat-activated adhesive member 18 so as to adhesively bond the hardware member 14 to the window member 12. The adhesive member 18 is fully cured during the heating process of FIG. 3.

The next step in the process of making the bonded window and hardware assembly in accordance with the invention is to overmold a sealing member 20. The sealing member 20 envelopes part of the flange 14a, fully surrounds the adhesive member 18, and bonds to and seals against the surface 12a of the window member 12. The sealing member contacts at least part, with respect to a radial direction of the hardware member 14, of the first surface 15 of the flange 14a, contacts all of the peripheral edge surface 17 of the flange, and contacts at least part, with respect to said radial direction, of the peripheral edge portion 16a of the second surface 16 of the flange. The sealing member extends continuously and completely about the flange 14a and the adhesive member 18 in a circumferential direction. By virtue of the fact that the sealing member 20 has a portion that intrudes between and completely and sealingly fills the aforementioned space between the periphery 16a of the flange surface 16 and the surface 12a of the window member 12, the sealing member serves to protect the adhesive member 18 from heat and humidity in the surrounding environment.

As note, the sealing member 20 can comprise an overmolded member formed of a polymer material. For example, the polymer material can comprise polyvinyl chloride or a thermoplastic elastomer, or any other suitable polymer material.

Figure 4:
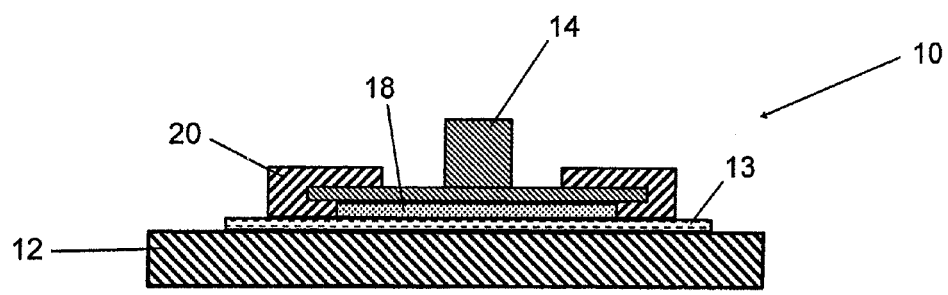
FIG. 4 illustrates a final bonded window and hardware assembly in accordance with an embodiment of the invention.

FIG. 4 shows the final assembly 10 after the overmolding process is completed. As illustrated, optionally the assembly 10 can include a black ceramic layer 13 interposed between the window member 12 and the adhesive member 18 for protecting the adhesive member from ultraviolet radiation transmitted through the window member 12. The black ceramic layer 13 also has aesthetic advantages in that it covers and therefore hides the adhesive member 18 from view through the back side of the window member 12.

It is not essential that molding be employed for creating the sealing member 20. Thus, other techniques for creating the sealing member 20 can be used, as long as the desired three-sided contact with the flange, and the complete surrounding of the adhesive member 18, are achieved. For example, a dispenser or applicator can be used to dispense a polymer material onto the flange 14a in such a manner that the polymer material contacts the three sides of the flange and fully surrounds the adhesive member 18. Suitable polymers for such use can include, for example, silicone, urethane, epoxy, and the like.

The assembly 10 can be used in a variety of contexts and applications. For example, the window member 12 can comprise a piece of vehicular glazing such as a windshield or side window. The hardware member 14 can comprise a mounting stud or other piece of hardware. In the illustrated embodiment, the hardware member 14 is a mounting stud having a flange 14a and a projecting or stud portion 14b. The projecting portion 14b can be externally or internally threaded for mating with another threaded part such as a rearview mirror housing or side view mirror housing. The present invention, however, is not limited to any particular type of hardware member 14.

The adhesive member 18 can comprise any of various adhesive compositions and devices. Examples of suitable adhesive compositions include but are not limited to structural adhesives such as two-component and single-component urethane adhesives, adhesives based on epoxies and/or acrylate polymer or copolymer, silicones, combinations thereof, and the like. Examples of suitable commercially available structural adhesives include BETAMATE 73100 structural adhesive (a two-component urethane adhesive system) available from Dow Automotive Systems, LORD® 7542 (a two-component urethane adhesive system) available from Lord Corporation, and PLIOGRIP® 7773 (a two-component urethane adhesive system) available from Ashland Inc.

For example, the adhesive member can comprise a two-sided structural bonding tape (i.e., a tape having adhesive on both its opposite faces) employing an adhesive such as those listed above. Examples of commercially available structural bonding tapes of this type include the #9214, #9263, and #9270 structural bonding tapes available from 3M Company. These tapes employ an adhesive comprising a blend of an acrylate copolymer and epoxy resin, along with curing agent for the epoxy and other additives.

The invention, however, is not limited to any particular type or composition of adhesive member 18.

Figure 5:
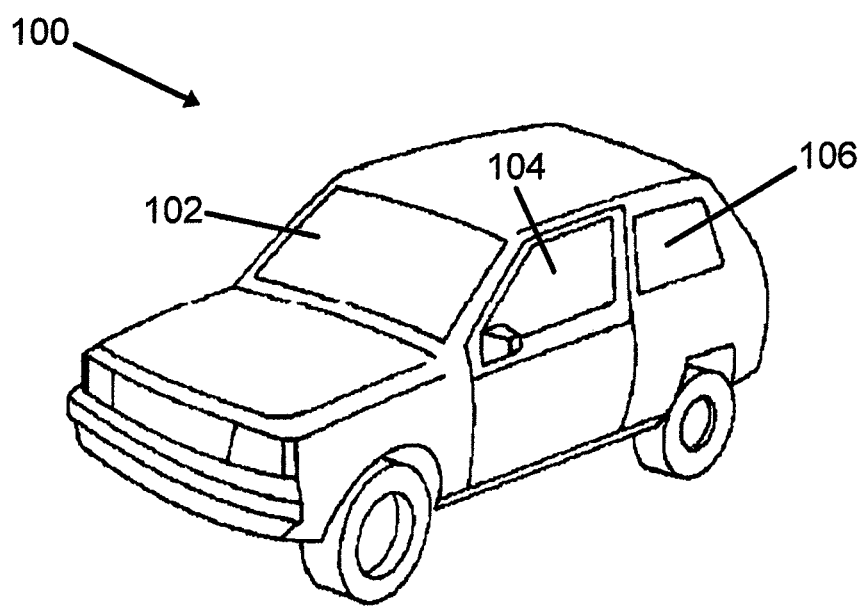
FIG. 5 depicts an exemplary vehicle to which the present invention is applicable.

FIG. 5 illustrates an exemplary vehicle in which the present invention can be employed. The depicted vehicle 100 is of the sport utility vehicle (SUV) type, although the invention of course is not limited to that or any other type of vehicle. In any case, the vehicle 100 includes a front windshield 102, front side windows 104, rear side windows 106, and a (not visible) rear window. It is common in many such vehicles for the rear side windows (such as the depicted rear side windows 106, or additional unillustrated rear side windows often located adjacent the farthest rear seating area) to be hinged or tiltable for ventilation purposes. To make such a window tiltable, one side edge (usually the front side edge) of the window is typically attached to hinge members attached to a structure of the window frame. The opposite side edge (usually the rear side edge) has a latch assembly for latching the window closed, the latch assembly being manipulated to allow the window to be tilted for ventilation. The present invention can be applied for affixing a component of the latch assembly to the window panel. For example, the hardware member 14 described previously can be a component of the latch assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An adhesively bonded window and hardware assembly, comprising:

a window member presenting a surface;

a hardware member comprising a flange and a projecting portion contiguous with the flange, the flange defining opposite first and second surfaces both of which join with a peripheral edge surface of the flange, the projecting portion projecting from the first surface in a direction away from the opposite second surface;

an adhesive member disposed between the second surface of the flange and the surface of the window member and adhesively bonding the hardware member to the window member, the adhesive member having a smaller footprint than that of the flange such that a peripheral edge portion of the second surface of the flange is free of the adhesive member; and a sealing member that envelopes part of the flange, fully surrounds the adhesive member, and bonds to and seals against the surface of the window member, the sealing member contacting at least part, with respect to a radial direction of the hardware member, of the first surface of the flange, contacting all of the peripheral edge surface of the flange, and contacting at least part, with respect to said radial direction, of the peripheral edge portion of the second surface of the flange, and the sealing member extending continuously and completely about the flange and the adhesive member in a circumferential direction such that the sealing member serves to protect the adhesive member from heat and humidity in the surrounding environment.

2. The adhesively bonded window and hardware assembly of claim 1, wherein the sealing member comprises an overmolded member formed of a polymer material.

3. The adhesively bonded window and hardware assembly of claim 2, wherein the polymer material comprises a thermosetting polymer.

4. The adhesively bonded window and hardware assembly of claim 3, wherein the overmolded member is formed by reaction injection molding.

5. The adhesively bonded window and hardware assembly of claim 2, wherein the polymer material comprises polyvinyl chloride.

6. The adhesively bonded window and hardware assembly of claim 2, wherein the polymer material comprises a thermoplastic elastomer.

7. The adhesively bonded window and hardware assembly of claim 1, further comprising a black ceramic layer on the window member and forming the surface of the window member, the black ceramic layer protecting the adhesive member from ultraviolet radiation transmitted through the window member.

8. The adhesively bonded window and hardware assembly of claim 1, wherein the window member comprises a piece of vehicular glazing.

9. The adhesively bonded window and hardware assembly of claim 8, wherein the hardware member comprises a mounting stud.

10. The adhesively bonded window and hardware assembly of claim 1, wherein the adhesive member comprises an adhesive selected from the group consisting of two-component urethane adhesives, single-component urethane adhesives, epoxies, acrylate polymers, acrylate copolymers, silicones, and combinations thereof.

11. The adhesively bonded window and hardware assembly of claim 10, wherein the adhesive member comprises a structural bonding material.

12. The adhesively bonded window and hardware assembly of claim 11, wherein the structural bonding material comprises a tape.

* * * * *